United States Patent [19]

Schultz

[11] Patent Number: 4,683,813
[45] Date of Patent: Aug. 4, 1987

[54] SYNCHRONIZED PRESS FOR BAKERY PRODUCTS

[76] Inventor: George A. Schultz, 176 Ohio Ave., New Braunfels, Tex. 78130

[21] Appl. No.: 789,948

[22] Filed: Oct. 21, 1985

[51] Int. Cl.⁴ ............................................. A47J 37/00
[52] U.S. Cl. ....................................... 99/353; 99/349; 99/372; 99/373; 100/93 P; 100/144
[58] Field of Search ................ 100/93 P, 158 C, 144, 100/151, 156, 177, 178, 223, 238; 426/502, 523; 425/418, 167, 166; 99/349, 353, 355, 372, 373, 377, 389, 423, 427, 443 C, 395, 448

[56] References Cited

U.S. PATENT DOCUMENTS

| | | |
|---|---|---|
| 1,869,539 | 8/1932 | Brand . |
| 2,696,377 | 12/1954 | Gouner . |
| 2,830,529 | 4/1958 | Jaffe . |
| 2,986,103 | 5/1961 | Flores . |
| 3,111,913 | 11/1963 | Mladek et al. . |
| 3,223,053 | 12/1965 | Jimenez et al. . |
| 3,397,655 | 8/1968 | Valadez et al. . |
| 3,425,364 | 2/1969 | Martin, Jr. . |
| 3,457,853 | 7/1969 | Morley . |
| 3,858,505 | 1/1975 | Lassiter ........................ 100/158 C |
| 3,905,757 | 9/1975 | von Dreusche, Jr. . |
| 3,919,828 | 11/1975 | Zellman ............................ 100/223 |
| 4,228,133 | 10/1980 | Lindroos et al. . |
| 4,241,648 | 12/1980 | Longenecker . |
| 4,508,025 | 4/1985 | Schultz . |
| 4,511,318 | 4/1985 | Kolodesh ...................... 426/502 X |

Primary Examiner—Robert W. Jenkins
Attorney, Agent, or Firm—Gunn, Lee & Jackson

[57] ABSTRACT

A synchronized press and method for forming bakery products. A press plate presses a portion of bakery product ingredients against a rotatable disc in a continuous motion. A conveyor belt deposits portions of the bakery product ingredients on the disc at timed intervals. A gearing mechanism synchronizes the movement of the press plate and disc so that the horizontal speed of the press plate is substantially equivalent to the angular speed of the disc. The gearing mechanism also synchronizes the deposit of bakery product ingredients on the disc.

14 Claims, 19 Drawing Figures

SYNCHRONIZED PRESS FOR BAKERY PRODUCTS

BACKGROUND OF THE INVENTION

The present invention relates to a synchronized press for forming bakery products, such as tortillas, pizza, chapati bread, or pita bread.

The formation of bakery products typically involves utilization of a press wherein the bakery product ingredients are pressed or formed between two surfaces, either or both of which may be movable relative to the other. For example, U.S. Pat. No. 3,223,053 issued to Jimenez, et al. discloses a machine for forming tortillas comprising a lower conveyor unit upon which dough units are deposited from a conveyor and an upper conveyor unit which cooperates with the lower conveyor unit to compress the dough units and form the tortilla therebetween. Drive means drive a lower belt which, in turn, drives an upper belt by means of interengaged dogs. Means are also provided to heat the conveyor units and dough units being flattened into tortillas prior to their discharge from the machine. U.S. Pat. No. 2,986,103 issued to Flores discloses a machine for making corn tortillas comprising a pair of cooperative forming rollers which each rotate about a horizontal axis. The rollers are geared to each other, with one roller driving the other through the gears. Dough is initially fed to the cooperating rollers from a hopper mounted above the rollers. The dough shapes formed by the cooperating rollers are carried between the coacting portions of two belts, each of which is positioned about one of the rollers, and thereafter passed onto a conveyor belt for ultimate baking by a cylindrical baking drum and horizontal circular pan.

U.S. Pat. No. 3,397,655 issued to Valadez, et al. discloses a machine for forming flour tortillas comprising a heated plate adapted for vertical movement relative to a heated support plate adapted for manual horizontal movement. The support plate is temporarily placed beneath the upper plate to allow the upper plate to press or form the tortilla from the dough resting atop the lower support plate. The lower support plate is thereafter withdrawn, the flattened tortilla removed therefrom, and a subsequent ball of dough placed on the lower support plate. U.S. Pat. No. 4,241,648 issued to Longenecker discloses an apparatus for shaping and precooking tortillas comprising a heated roll which revolves in stepped movements relative to a heated compression plate which periodically moves toward and away from the roll to coordinate the positioning of the plate with the step motion of the roll. The compression plate forms the tortilla by pressing the dough against the top of the roll while the roll is in the stop phase for a predetermined period. The formed tortilla is discharged onto a conveyor through the cooperative interaction of a scraper and the turning roll. The dough is initially deposited on the roll from a feed ramp and delivered beneath the compression plate by a feed plate. In both Valadez, et al. and Longenecker, the lower press plate or roll, respectively, is stopped to allow the upper press plate to press or form the tortilla thereagainst. As such, neither Valadez, et al. nor Longenecker teach or suggest pressing the bakery product in a continuous manner.

U.S. Pat. No. 3,457,853 issued to Morley discloses a hamburger grill comprising a cylindrical drum roller which compresses preformed hamburger patties atop a circular cooking disk mounted for rotation on a verticle axis. Such compression is intended to loosen the texture of the meat and break up the body of the meat and also serves to press the patties tightly against the cooking disk. The drum roller is mounted for rotation about a substantially horizontal shaft and the height of the drum roller may be adjusted by rotating the shaft. The drum roller apparently rotates when urged to do so by means of the hamburger patties passing beneath it.

None of the aforementioned references teach or suggest a press plate and a press disc rotatable about a substantially vertical axis wherein the press plate presses bakery product ingredients against the disc to form a bakery product therefrom and wherein the movement of the press plate and press disc are synchronized so that the horizontal speed of the press plate is substantially equivalent to the angular speed of the disc.

SUMMARY OF THE INVENTION

Accordingly, the present invention provides a synchronized press whereby a bakery product may be formed atop a rotatable disc in a continuous manner. The present invention comprises a press plate and a press disc for receiving a portion of bakery product ingredients thereon rotatable about a substantially vertical axis. A gearing mechanism is provided whereby the press plate presses the bakery product ingredients against the disc to thereby form the bakery product and the horizontal speed of the press plate is substantially equivalent to the angular speed of the disc. A conveyor system in operative engagement with the gearing mechanism is also provided for delivering predetermined portions of bakery product ingredients to the press disc in timed intervals corresponding to the pressing action of the plate.

The present invention also provides a method for forming a bakery product. The method comprises the steps of depositing a portion of bakery product ingredients on the conveyor in spaced intervals, depositing the portion of bakery product ingredients on the rotatable disc in timed intervals, rotating the press disc at a predetermined speed, and moving the press plate relative to the rotating disc so that the press plate presses the bakery product ingredients against the disc and the horizontal speed of the press plate is substantially equivalent to the angular speed of the disc. The formed bakery product may thereafter be removed from the rotating disc for subsequent toasting.

DETAILED DESCRIPTION OF THE PREFERRED EMBODIMENT

The synchronized press of the present invention is described hereinbelow in connection with an oven for toasting a bakery product, similar to the oven portion disclosed in U.S. Pat. No. 4,508,025, the disclosure of which is incorporated herein by reference. It is to be understood, however, that the present invention is directed to the synchronized formation of a bakery product which may thereafter be toasted in any manner.

Figure 1:
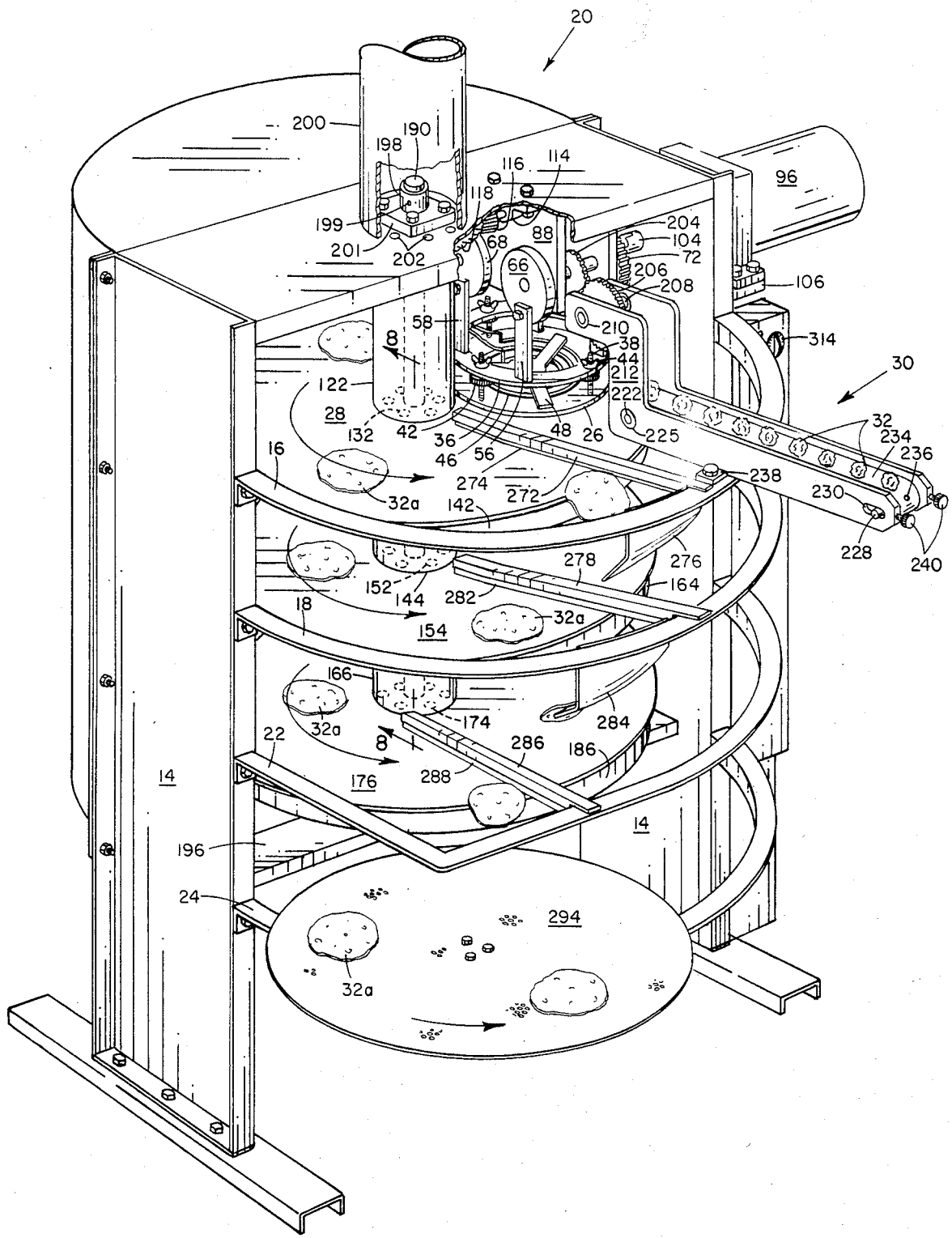
FIG. 1 is a persepctive view of a preferred embodiment of a synchronized press for bakery products, illustrated in combination with an oven for toasting the bakery product.
Figure 2:
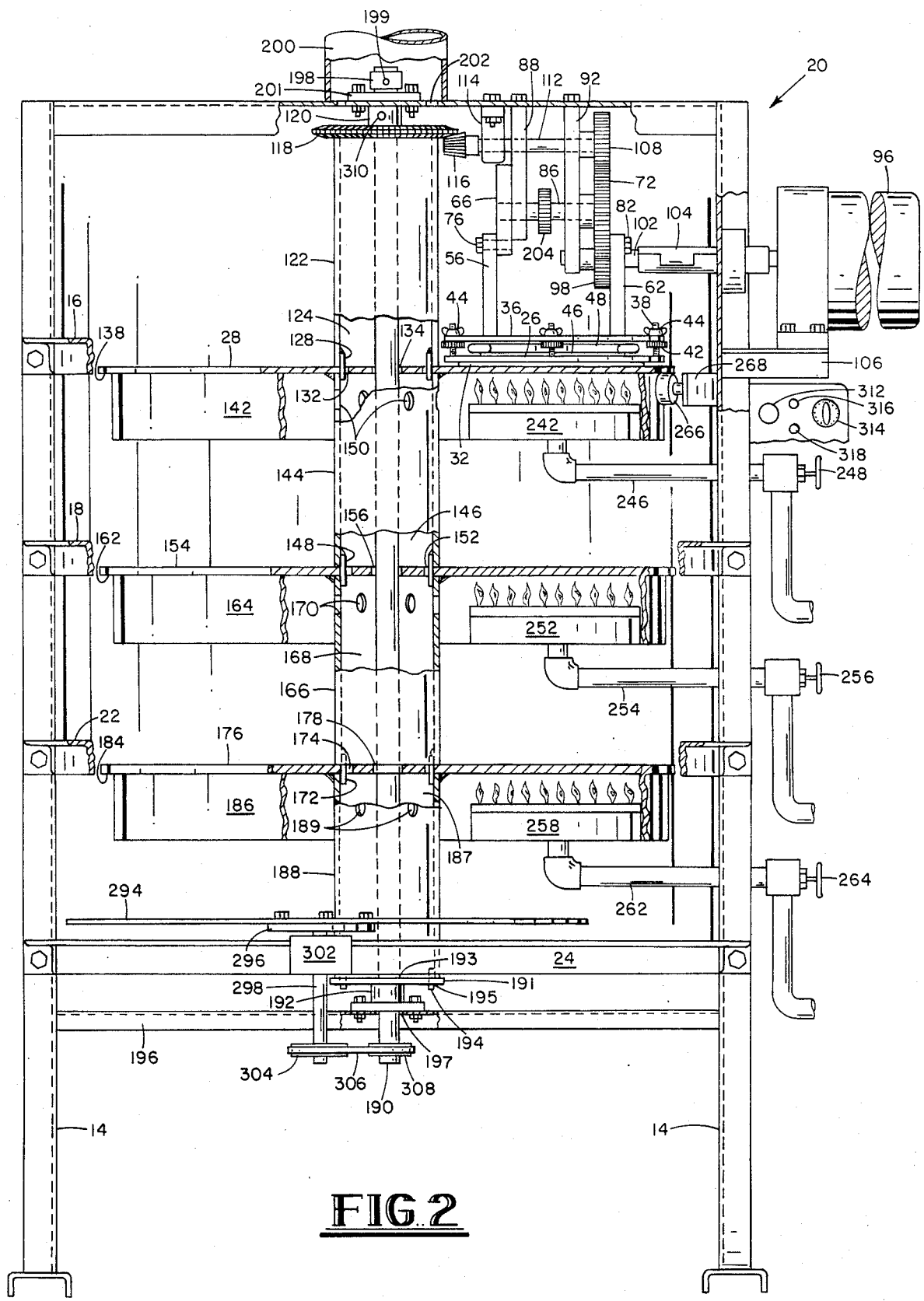
FIG. 2 is a frontal cut-away view of a preferred embodiment of a synchronized press for bakery products, illustrated in combination with an oven for toasting the bakery product, with the conveyor omitted for the sake of clarity.

Referring to FIGS. 1 and 2, the oven and synchronized press are preferably supported by an open housing 20 comprising a pair of supports or legs 14 and a plurality of ribs 16, 18, 22, and 24 which are bolted or otherwise appropriately connected to supports 14. The synchronized press apparatus comprises a circular press plate 26 which is movable relative to a rotatable press disc 28 in a manner which will be described more fully hereinbelow. The synchronized press apparatus also preferably comprises a conveyor mechanism 30 for depositing a ball of dough or other predetermined portion of bakery product ingredients 32 on the rotating disc 28.

Figure 3:
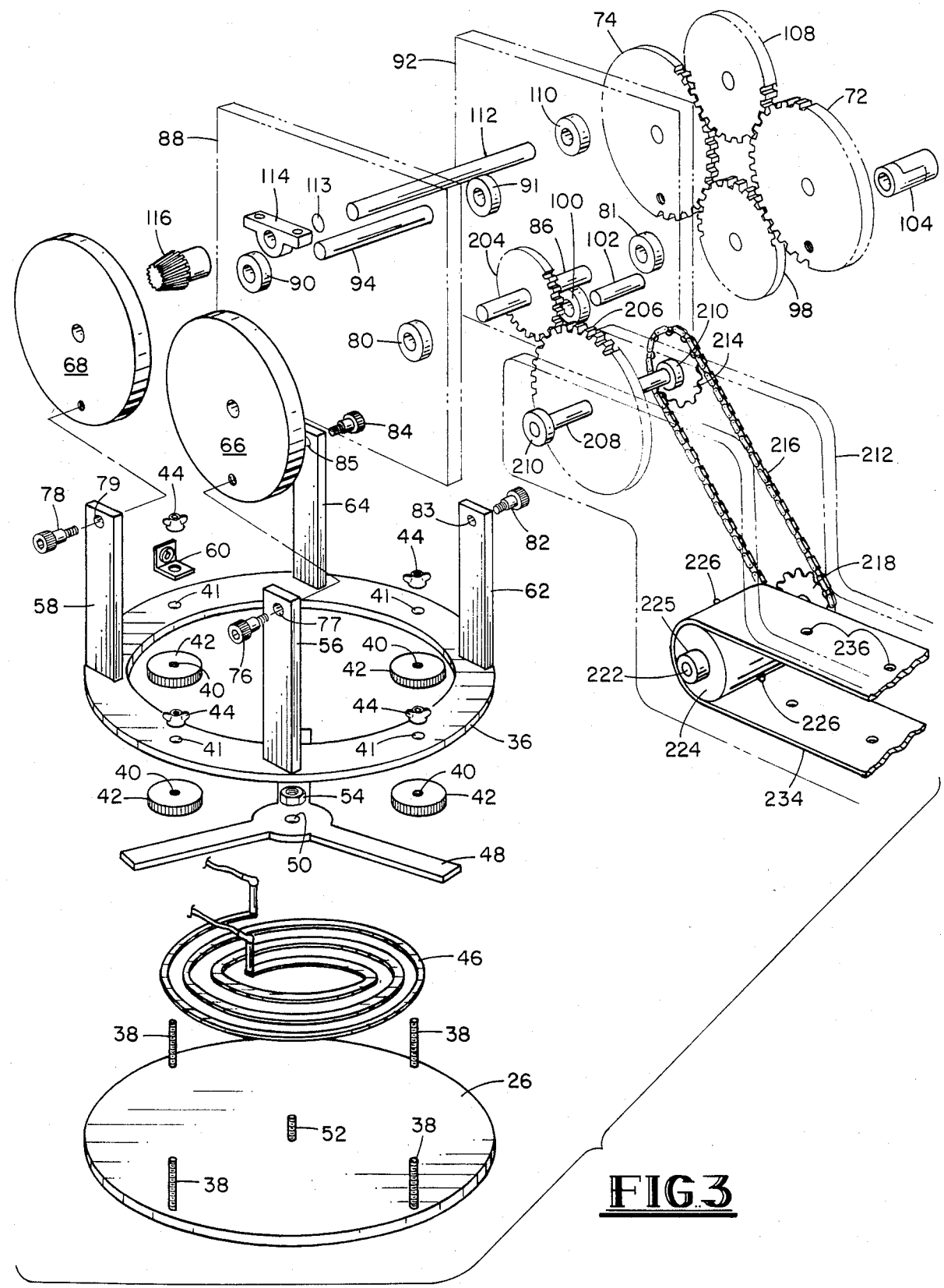
FIG. 3 is a partial exploded view of a preferred embodiment of a synchronized press for bakery products illustrating the press plate, conveyor, and gearing mechanism.
Figure 4:
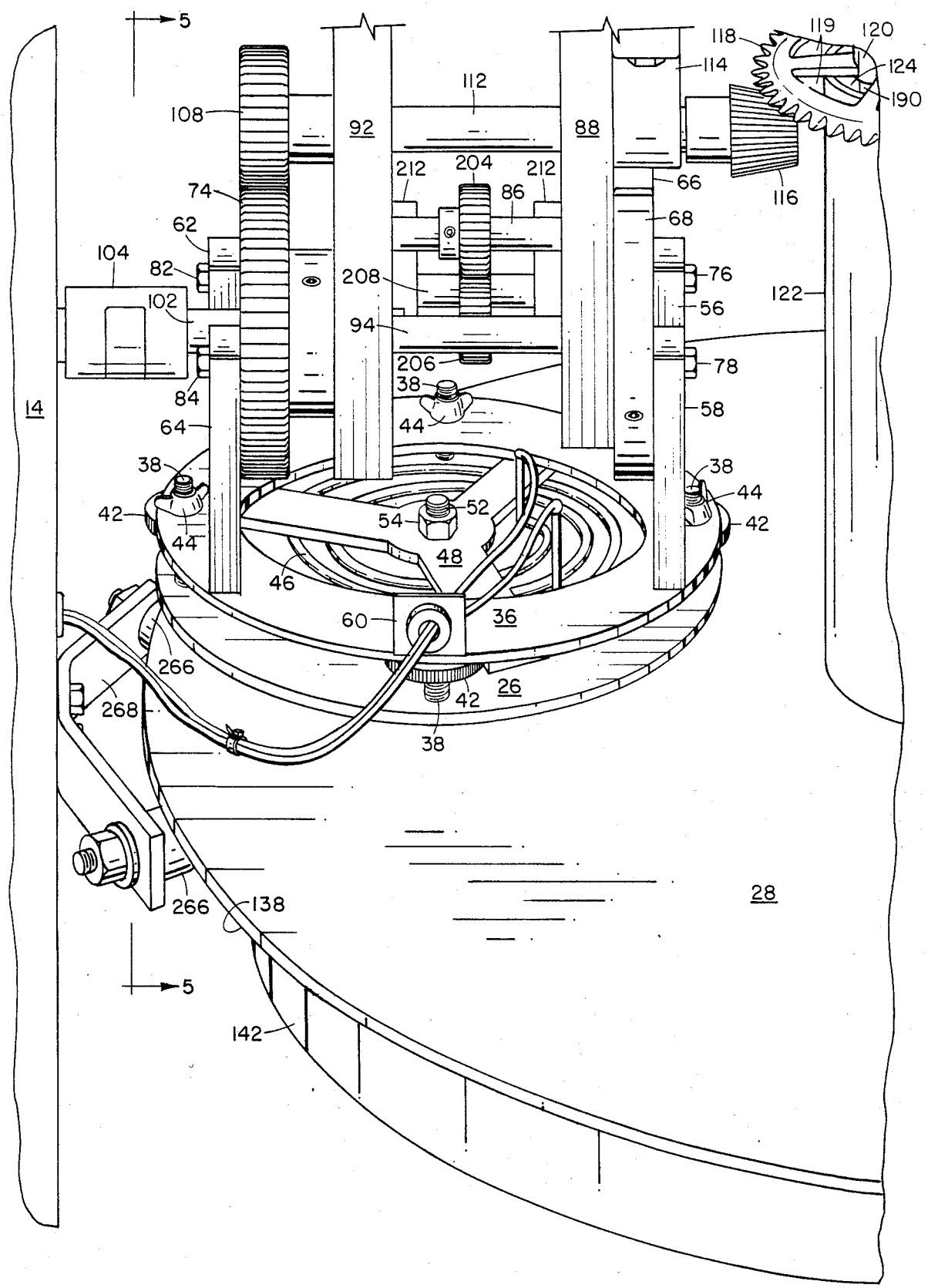
FIG. 4 is a partial rear elevational veiw of a preferred embodiment of a synchronized press for bakery products illustrating the press plate, press disc, and gearing mechanism.

Referring to FIGS. 3 and 4, the preferred embodiment of a synchronized press is illustrated in greater detail. The press plate 26 is connected to an adjustment ring 36 by means of a plurality of upstanding threaded studs 38 which are welded or otherwise connected to the perimeter of press plate 26 on the top side thereof. Each of the studs 38 extends through a threaded passage 40 in an adjustment screw 42, in threaded engagement therewith, and through a passage 41 in ring 36. Adjustment screws 42 are located intermediate press plate 26 and adjustment ring 36 flush with the underside of ring 36. Each of the studs 38 is also provided with wing nut 44 in threaded engagement therewith on the end thereof opposite press plate 26. The press plate 26 is preferably steel and provided with a Teflon coating on the underside thereof facing disc 28.

Referring again to FIGS. 3 and 4, a conventional electric heating element 46 is held against the top side of press plate 26 by means of a metal, Y-shaped holddown 48. The holddown 48 is held against the heater element 46 by means of a threaded stud 52 connected to the top side of press plate 26 and extending upward therefrom in approximately the center thereof through a passage 50 in the Y-shaped holddown 48. A nut 54 is connected to the uppermost end of threaded stud 52 against holddown 48 in threaded engagement with stud 52. In the preferred embodiment, heating element 46 is approximately 1500 watts capable of heating press plate 26 to approximately 250° F. to 300° F. Further, the arms of holddown 48 are approximately 120° apart in order to press heating element 46 evenly against the top side of press plate 26. The wires to heating element 46 are preferably supported by a bracket 60 which is mounted to a stud 38 atop adjustment ring 36.

Referring to FIGS. 2, 3, and 4, the cam or gear mechanism for moving press plate 26 relative to disc 28 will be described in greater detail. A plurality of connector bars 56, 58, 62, and 64 are connected to the top of adjustment ring 36 and extend vertically upward therefrom. Connector bars 56, 58, 62, and 64 are connected on the uppermost ends thereof to cam 66, cam 68, first gear 72, and second gear 74, respectively, by means of shoulder bolts 76, 78, 82, and 84, respectively. Shoulder bolts 76, 78, 82, and 84 extend through passages 77, 79, 83, and 85, respectively, in bars 56, 58, 62, and 64, respectively, in threaded engagement with first cam 66, second cam 68, first gear 72, and second gear 74, respectively. Passages 77, 79, 83, and 85 are preferably provided with oil light bearings (not shown) to facilitate rotation of bars 56, 58, 62, and 64 about shoulder bolts 76, 78, 82, and 84, respectively.

Referring again to FIGS. 2, 3, and 4, a first drive shaft 86 is connected on one end thereof to first cam 66 in approximately the center of cam 66 and first drive shaft 86 is connected on the opposite end thereof to first gear 72 in approximately the center of gear 72. First drive shaft 86 extends through a bearing 80 located in a first support wall 88 adjacent to first cam 66 and a bearing 81 located in a second support wall 92 adjacent to first gear 72, as illustrated in FIG. 3. A second drive shaft 94 is connected on one end thereof to second cam 68 in approximately the center of cam 68 and second drive shaft 94 is connected on the opposite end thereof to second gear 74 in approximately the center of gear 74. Second drive shaft 94 extends through a bearing 90 located in first support wall 88 adjacent to second cam 68 and a bearing 91 located in second support wall 92 adjacent second gear 74, as illustrated in FIG. 3. Support walls 88 and 92 are bolted or otherwise appropriately connected to housing 20.

Referring again to FIGS. 2, 3, 4, and FIG. 5, a gear reduction motor 96 drives a press drive gear 98 by means of a press drive shaft 102. The press drive shaft 102 is connected to the press drive gear 98 in approximately the center of gear 98 and is connected to the motor 96 by a coupling 104. Coupling 104 permits quick release of motor 96 from shaft 102 for repair or replacement of motor 96. Motor 96 is preferably mounted to the housing 20 by means of a bracket 106 which is bolted or otherwise appropriately connected to housing 20. In the preferred embodiment, motor 96 has a work output of approximately one-twelfth (1/12) horsepower. The end of press drive shaft 102 opposite motor 96 preferably extends through a bearing 100 located in second support wall 92, as illustrated in FIG. 3. As illustrated by the arrows in FIG. 5, rotation of press drive gear 98 by press drive shaft 102 will effectuate rotation of first gear 72 and second gear 74 due to the geared engagement of press drive gear 98 with gears 72 and 74. Rotation of gears 72 and 74 will likewise effect rotation of first cam 66 and second cam 68, respectively, due to the connection therebetween of first drive shaft 86 and second drive shaft 94, respectively. Rotation of first cam 66, second cam 68, first gear 72, and second gear 74 will also effectuate movement of press plate 26 relative to press disc 28. That is, due to the connection of plate 26 to ring 36 and the connection of bars 56, 58, 62 and 64 to cam 66, cam 68, gear 72, and gear 74, respectively, and ring 36, as described hereinabove, rotation of cam 66, cam 68, gear 72, and gear 74 by press drive gear 98 will cause plate 26 to rotate in a generally circular path and move tangentially relative to the upper surface of disc 28, as illustrated in FIGS. 12A–12G. Note that press plate is limited to linear motion in the horizontal plane.

Figure 5:
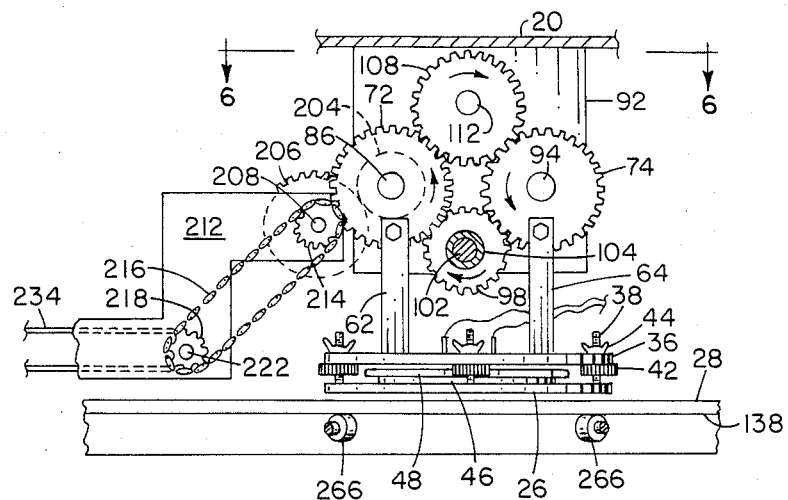
FIG. 5 is a sectional side view of the gearing mechanism for a preferred embodiment of a synchronized press for bakery products taken along section lines 5—5 of FIG. 4.
Figure 6:
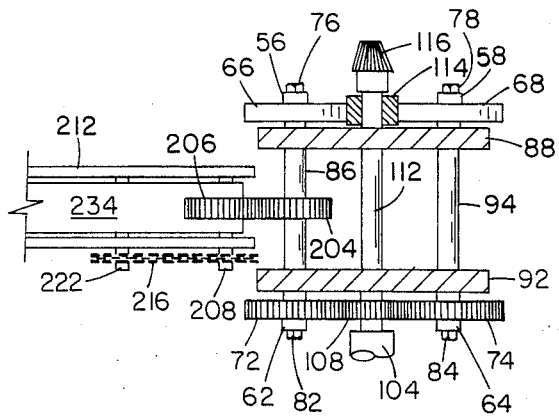
FIG. 6 is a top view of the gearing mechanism for a preferred embodiment of a synchronized press for bakery products taken along section lines 6—6 of FIG. 5.

As illustrated in FIGS. 5 and 6, first gear 72 and second gear 74 are in geared engagement with a disc drive gear 108 which has a disc drive shaft 112 connected thereto in approximately the center of gear 108. As illustrated in FIG. 3, disc drive shaft 112 extends through a bearing 110 located in support wall 92, a passage 113 through support wall 88, and a pillow block bearing 114 which is bolted or otherwise appropriately connected to housing 20. A right angle drive gear 116 is connected to the end of disc drive shaft 112 opposite disc drive gear 108 and is in geared engagement with a ring gear 118 having a collar 120, as illustrated in FIGS. 2 and 4. Rotation of first gear 72 and second gear 74 by means of press drive gear 98 will effectuate rotation of disc drive gear 108, thereby effectuating rotation of right angle drive gear 116 and ring gear 118 through disc drive shaft 112.

Figure 7:
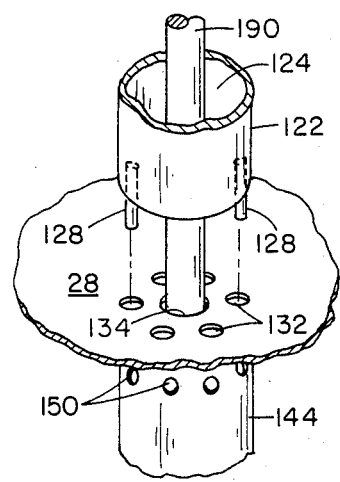
FIG. 7 is a partial perspective view of the rotatable press disc and center pipe in a preferred embodiment of a synchronized press for bakery products.

Referring to FIGS. 1, 2, 7, and 8, the press disc 28 and rotation thereof will be described in greater detail. A center pipe 122 having a hollow passage 124 therein is welded or otherwise appropriately connected on the uppermost end thereof to ring gear 118. The lowermost end of center pipe 122 has a pair of pins 128 welded thereto on the inside thereof which extend through a pair of a plurality of holes 132 in press disc 28, as illustrated in FIGS. 2 and 7. Press disc 28 is also provided with a hole 134 in approximately the center thereof. As illustrated in FIG. 2, disc 28 is additionally provided with a lip 138 on the underside thereof and a downwardly extending skirt 142 which is welded or otherwise appropriately connected to the underside of disc 28.

Figure 8:
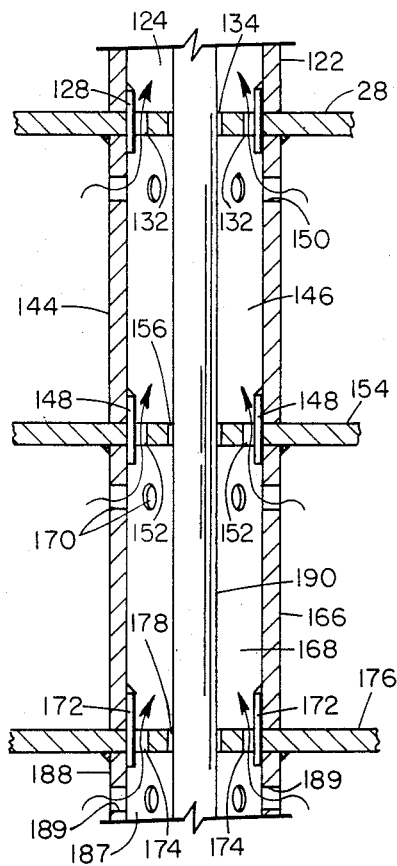
FIG. 8 is a partial cross-sectional view taken along section lines 8—8 of FIG. 1 illustrating the rotatable press disc of a preferred embodiment of a synchronized press for bakery products in combination with discs for toasting the bakery product thereon.

As indicated hereinabove, the synchronized press of the present invention may be utilized in connection with an oven similar to the oven portion disclosed in U.S. Pat. No. 4,508,025. In this embodiment, a second center pipe 144 having a hollow passage 146 therein is welded or otherwise appropriately connected to the underside of press disc 28 in approximately the center of disc 28, as illustrated in FIGS. 2 and 8. A plurality of gas flow ports 150 extend through center pipe 144 near the uppermost end thereof. The second center pipe 144 is also provided with a pair of pins 148 which are welded to the inside of center pipe 144 and extend vertically downward through a pair of a plurality of holes 152 in first cooking disc 154, as illustrated in FIGS. 2 and 8. Cooking disc 154 is additionally provided with a hole 156 in approximately the center thereof. First cooking disc 154 is also provided with an annular lip 162 on the underside thereof and a downwardly extending skirt 164 which is welded or otherwise appropriately connected thereto on the underside thereof, as illustrated in FIG. 2.

Referring again to FIGS. 2 and 8, the preferred embodiment is preferably provided with a third center pipe 166 which is welded or otherwise appropriately connected to the underside of first cooking disc 154 in approximately the center of disc 154 and has a hollow passage 168 therethrough. A plurality of gas flow ports 170 extend through center pipe 166 near the uppermost end thereof. Third center pipe 166 is also provided with a pair of pins 172 which are welded thereto on the inside thereof and extend vertically downward through a pair of a plurality of holes 174 in second cooking disc 176. Cooking disc 176 is also provided with a hole 178 in approximately the center thereof. As illustrated in FIG. 2, second cooking disc 176 is also provided with an annular lip 184 on the underside thereof and a downwardly extending skirt 186 which is welded or otherwise appropriately connected to the underside of disc 176.

Referring again to FIGS. 2 and 8, the preferred embodiment is preferably provided with a fourth center pipe 188 which is welded or otherwise appropriately connected to the underside of second cooking disc 176 in approximately the center of disc 176 and has a hollow passage 187 therethrough. A plurality of gas flow ports 189 extend through center pipe 188 near the uppermost end thereof. Center pipe 188 is supported by a round plate 191 which rests atop a tapered wheel bearing 192. Plate 191 has a hole 193 in approximately the center thereof. Fourth center pipe 188 is provided with a pair of pins 194 which are welded thereto on the inside thereof and extend vertically downward through a pair of holes 195 in support plate 191. Bearing 192 is bolted or otherwise appropriately oonneoted to a horizontal support bar 196 which is connected between housing supports 14 and has a passage 197 therethrough, as illustrated in FIG. 2.

In the preferred embodiment, a vertical center shaft 190 extends upward through passage 197, bearing 192, and center holes 178, 156, and 134 in discs 176, 154, and 28, respectively. Center shaft 190 also extends through the hollow passages 187, 168, 146, and 124 within center pipes 188, 166, 144, and 122, respectively, through ring gear 118, collar 120, and the top of housing 20. Shaft 190 also extends through a bearing plate 201 which is connected to housing 20. A collar 198 is connected to the uppermost end of center shaft 190 by means of a set screw 199 which extends through collar 198 into shaft 190. It is to be understood that center shaft 190 merely keeps discs 28, 154, and 176 in vertical alignment while plate 191 and wheel bearing 192 support the weight of discs 28, 154, and 176 and center pipes 122, 144, 166 and 188. In the preferred embodiment, shaft 190 is a steel rod having a diameter of approximately three-fourths inches ($\frac{3}{4}''$).

In the preferred embodiment, a gas exhaust flue 200 is appropriately connected to the top of housing 20 with a vent fan (not shown) associated therewith. The housing 20 is also provided with a plurality of gas exhaust ports 202 on the top thereof to permit flow of gas from within the housing 20 outward through the gas exhaust flue 200, as illustrated in FIGS. 1 and 2. It is to be understood that during the toasting process, fumes will pass through ports 189, 174, 170, 152, 150 and 132 and passages 187, 168, 146, and 124, as illustrated by the arrows in FIG. 8, and outward from housing 20 through ports 202. As illustrated in FIG. 4, gear 118 is also provided with ports 119 therethrough to permit passage of fumes therethrough from passage 124. It is also to be understood that pins 128, 148, and 172 can extend through any complementary pair of ports in discs 28, 154, and 176, respectively.

As illustrated by the arrows in FIG. 1, the rotation of ring gear 118, as previously described, will rotate center pipe 122 which, in turn, will rotate press disc 28 due to the engagement of first center pipe pins 128 within holes 132. The rotation of press disc 28 will effectuate rotation of first cooking disc 154 due to the corresponding rotation of second center pipe 144 and the engagement of second center pipe pins 148 within holes 152. The rotation of first cooking disc 154 will likewise effectuate rotation of second cooking disc 176 due to the corresponding rotation of third center pipe 166 and the engagement of third center pipe pins 172 within pin holes 174. Rotation of second cooking disc 176 will also rotate center pipe 188 which, in turn, will rotate support plate 191 atop bearing 192 due to the engagement of pins 194 within holes 195.

Referring to FIGS. 3, 5, and 6, the conveyor drive mechanism will be described in greater detail. First drive shaft 86 extends through approximately the center of and is connected to a first conveyor drive gear 204. Conveyor drive gear 204 is in geared engagement with a second conveyor drive gear 206. A conveyor drive shaft 208 extends through approxiamtely the center of and is connected to second conveyor drive gear 206. Conveyor drive shaft 208 extends through and is rotatable within a pair of bearings 210 located within opposite sides of a conveyor support frame 212, as illustrated in FIG. 3. As further illustrated in FIG. 3, one end of conveyor drive shaft 208 is connected to a first conveyor sprocket 214. A conveyor chain 216 extends between and about first conveyor sprocket 214 and a second conveyor sprocket 218. A drive sheave shaft 222 is connected to approximately the center of second conveyor sprocket 218 and rotates a drive sheave 224 located between the sides of conveyor frame support 212. Rotation of first drive shaft 86 by means of motor 96, shaft 102, gear 98, and gear 72 will effectuate rotation of gears 204 and 206, shaft 208, sprockets 214 and 218, chain 216, shaft 222, and drive sheave 224. Drive sheave shaft 222 extends through approximately the center of drive sheave 224 in engagement therewith and also extends through, and is supported within, a pair of bearings 225 located within opposite sides of the conveyor frame support 212. Drive sheave 224 is provided with a pair of upstanding pins 226 which extend outward therefrom approximately one hundred and eighty degrees (180°) apart.

Figure 9:
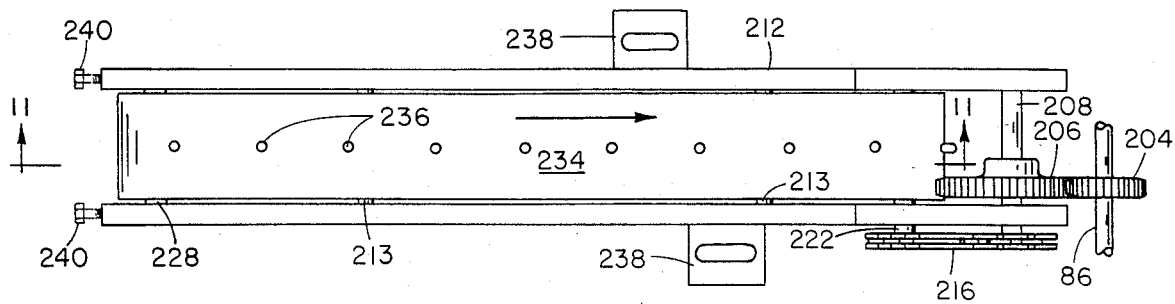
FIG. 9 is a top view of a conveyor mechanism utilized in a preferred embodiment of a synchronized press for bakery products.
Figure 10:
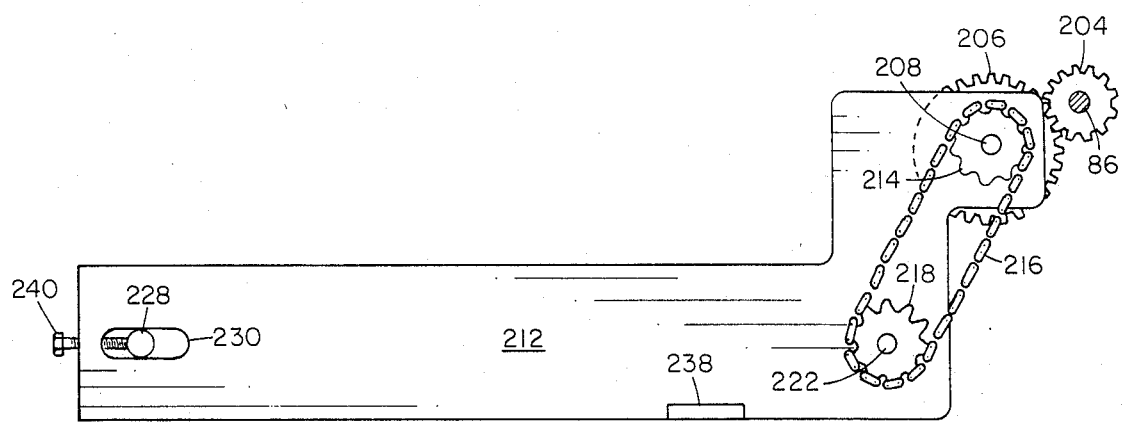
FIG. 10 is a side view of a conveyor mechanism utilized in a preferred embodiment of a synchronized press for bakery products.
Figure 11:
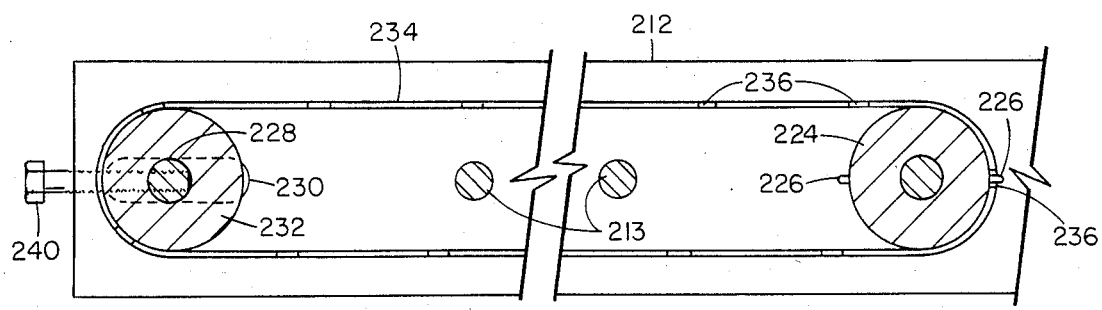
FIG. 11 is a partial cross-sectional view taken along section lines 11—11 of FIG. 9 illustrating a conveyor mechanism utilized in a preferred embodiment of a synchronized press for bakery products.

Referring to FIGS. 1, 9, 10, and 11, the opposite end of conveyor support 212 is provided with an idler sheave shaft 228 which is supported within an oval shaped passage 230 on each side of frame support 212. Idler shaft 228 extends through approximately the center of an idler sheave 232 which is rotatable about shaft 228. A continuous feeder belt 234 having a plurality of holes 236 therethrough is looped around drive sheave 224 and idler sheave 232. Feeder belt 234 is preferably made of food grade nylon. When drive sheave 224 is rotated, pins 226 will be inserted within holes 236, as illustrated in FIGS. 9 and 11, to drive or rotate feeder belt 234 in the direction illustrated by the arrow in FIG. 9, with idler sheave 232 simply rotating at the same speed as belt 234 and maintaining a tension within belt 234. Shaft 228 is held in place by, and the tension provided by idler sheave 232 is maintained by, a pair of bolts 240 which extend through frame 212 in threaded engagement with shaft 228, as illustrated in FIGS. 9, 10, and 11. As illustrated in FIG. 1, conveyor support frame 212 is preferably bolted to first rib 16 by means of a bracket 238 on each side of the support 212. As illustrated in FIGS. 9 and 11, a pair of frame support rods 213 extend between and are connected to conveyor supports 212.

Referring to FIG. 2, the remaining features of the press and the oven preferably utilized in connection with the press will be described in greater detail. The press disc 28 is provided with a gas burner 242 located beneath disc 28 within skirt 142. Gas burner 242 is connected to a gas manifold (not shown) by appropriate gas tubing 246 with the gas manifold connected to an appropriate gas supply (not shown). First gas burner 242 is provided with its own pilot (not shown), pilot controller (not shown), and valve 248. The first cooking disc 154 is also provided with a gas burner 252 located beneath disc 154 within skirt 164. The burner 252 is connected to the gas manifold (not shown) by appropriate tubing 254. The gas burner 252 is provided with its own pilot (not shown), pilot controller (not shown), and its own valve 256. The second cooking disc 176 is provided with a gas burner 258 located beneath disc 176 within skirt 186. Gas burner 258 is connected to the gas manifold (not shown) by appropriate gas tubing 262 and is provided with its own pilot (not shown), pilot controller (not shown), and valve 264. It is to be understood that discs 28, 154, and 176 are essentially steel hot plates and that their respective gas burners 242, 252, and 258 are the same as found in a conventional hot plate. Further, the gas flow system described herein is essentially a conventional gas flow system. It is also to be understood that the temperature of discs 28, 154, and 176 can be manually controlled independent of the other discs. Further, each disc rotates over the top of its respective burner, thereby permitting independent control of the temperature of each disc by controlling the temperature of a single burner.

Referring to FIGS. 4 and 5, the press disc 28 is provided with a pair of rotatable follower bearings 266 which are located immediately beneath lip 138 and are appropriately connected to an arm 268 connected to support 14. Follower bearings 266 counteract the action of the press plate 26 on the disc 28 so that the center shaft 190 is not required to carry the entire pressing load.

Referring to FIG. 1, the first rotating press disc 28 is preferably provided with a fixed scraper 272 which is bolted or otherwise appropriately connected to first rib 16 and has a flexible edge or border 274 adjacent to the upper surface of disc 28. A curved slide 276 is also connected to first rib 16 and located intermediate disc 28 and disc 154. Disc 154 is also provided with a fixed scraper 278 which is bolted or otherwise appropriately connected to second rib 18 and has a flexible border 282 adjacent to the upper surface of disc 154. A curved slide 284 is also connected to rib 18 and located intermediate disc 154 and disc 176. Disc 176 is provided with a fixed scraper 286 which is bolted or otherwise appropriately connected to rib 22 and has a flexible border 288 adjacent to the upper surface of disc 176.

As illustrated in FIGS. 1 and 2, a rotable cooling tray 294 is located partially beneath cooking disc 176 for receiving the toasted bakery product 32a thereon. Cooling tray 294 is bolted or otherwise connected to, and supported by, a flange 296 which has a drive shaft 298 connected thereto extending vertically downward therefrom through a bearing box 302 connected to rib 24. Shaft 298 extends through approximately the center of a first cooling tray pulley 304 which is connected to cooling tray drive shaft 298 on the end thereof opposite flange 296. A pulley drive belt 306 is passed around first pulley 304 and a second pulley 308. Pulley 308 is connected to the lowermost end of center shaft 190 which extends through approximately the center of pulley 308. The frictional drag engagement of a set screw 310 with center shaft 190 through collar 120 will cause center shaft 190 to rotate upon rotation of gear 118, thereby rotating cooling tray drive shaft 298 and the cooling tray 294, as illustrated by the arrow in FIG. 1. In the preferred embodiment, tray 294 is constructed of perforated stainless steel and belt 306 is a conventional automobile V belt.

Figure 13:
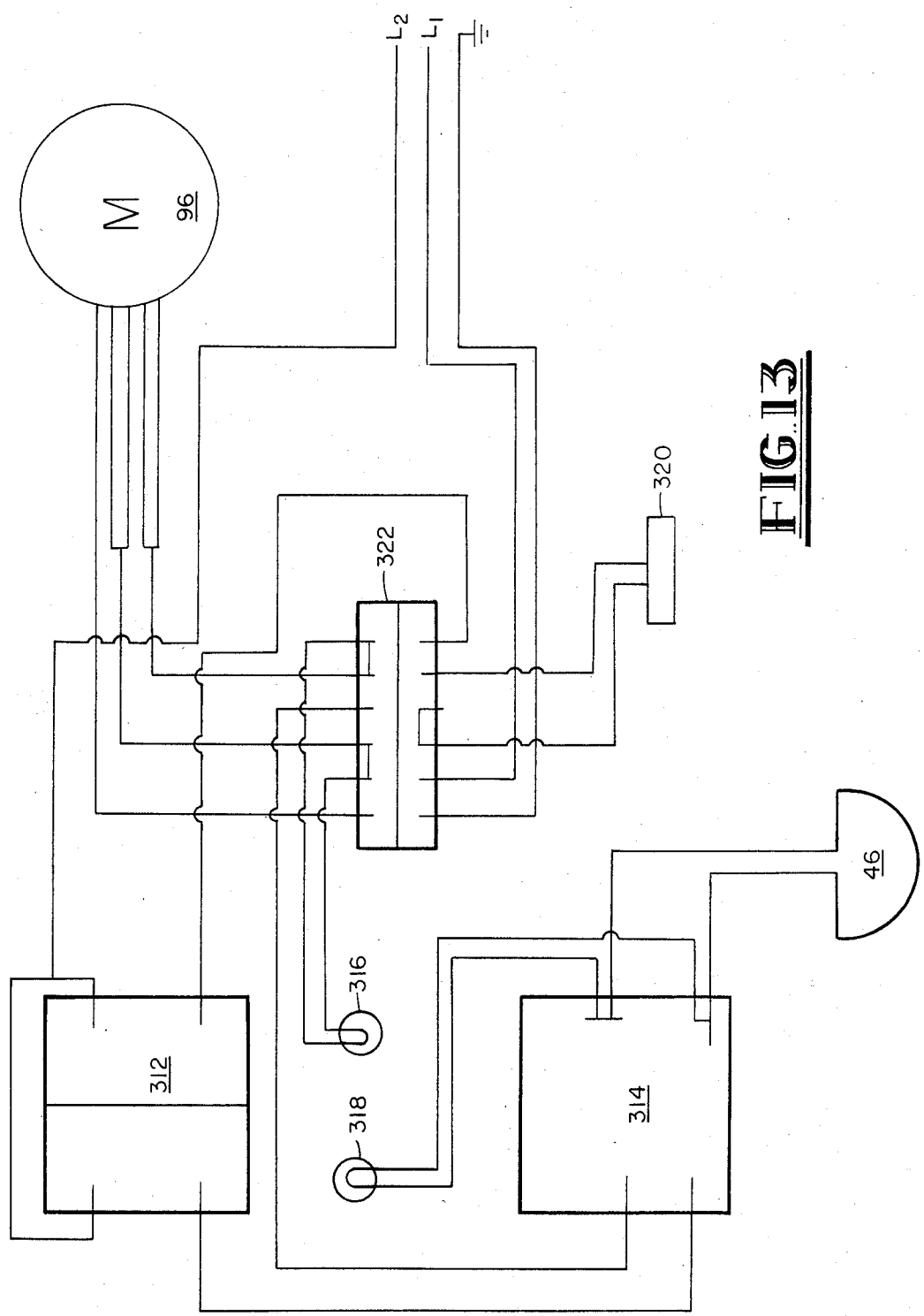
FIG. 13 is a schematic diagram of the electrical system utilized in a preferred embodiment of a synchronized press for bakery products.

Prior to operation of the synchronized press invention, a ball of dough 32 or other bakery product ingredient is placed atop each of the holes 236 on the top side of conveyor belt 234, as illustrated in FIG. 1. It is to be understood that belt 234 preferably has approximately twenty-one (21) holes therethrough and that belt holes 236 also function as timing marks and are preferably spaced approximately three inches (3") apart to permit deposit of the dough 32 atop disc 28 in timed intervals. The ON/OFF button 312 is thereafter activated to energize motor 96, thereby effectuating movement of press plate 26, rotation of press disc 28 and cooking discs 154 and 176, and rotation of cooling tray 294, as described herein. The activation of motor 96 will also cause conveyor belt 234 to rotate and begin depositing the balls of dough 32 atop press disc 28 in timed intervals synchronized with the movement of press plate 26. As illustrated in FIGS. 2 and 13, the temperature of the heating element 46 is controlled by an infinite switch 314 and the electricity to element 46 will cycle ON and OFF to keep the temperature of plate 26 substantially constant. A red light 316 indicates that the motor 96 is activated while a yellow light 318 indicates that the heater switch is activated. The electrical system is also provided with a solenoid 320 and terminal 322, as illustrated in FIG. 13. Solenoid 320 will shut off the gas flow system when button 312 is OFF.

Figure 12A:
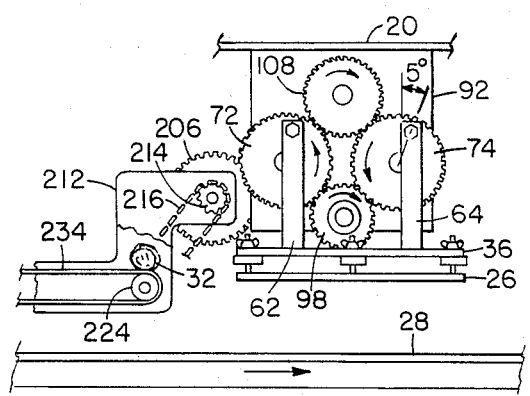
FIGS. 12A–12G are sequential views illustrating the movement of a press plate relative to a press disc and the formation of a bakery product in a preferred embodiment of a synchronized press for bakery products.
Figure 12B:
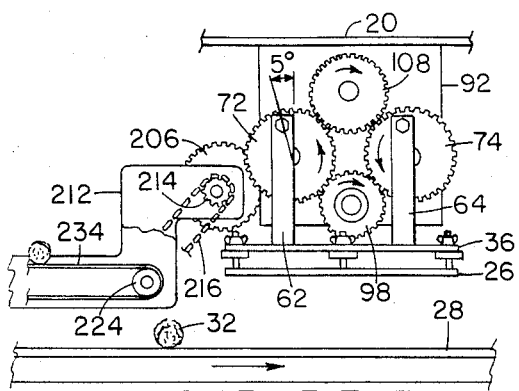
Figure 12C:
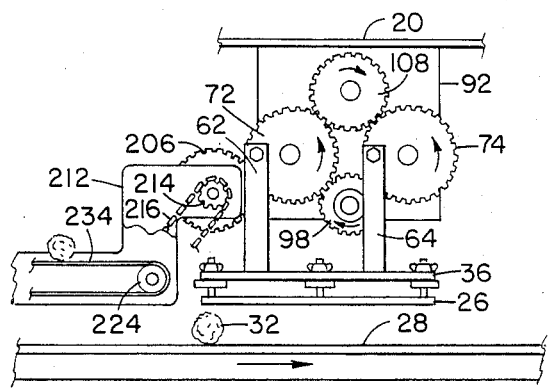

Referring to FIGS. 12A–12G, the sequence for forming a tortilla or other bakery product 32a from a ball of dough or other bakery product ingredients 32 will be described in greater detail. As illustrated in FIG. 12A, the press plate 26 will be approximately 5 degrees (5°) before its highest vertical point when the ball of dough 32 is on the forward edge of feeder belt 234. The ball of dough 32 thereafter drops onto disc 28 from belt 234 and actually contacts press disc 28 when press plate 26 is approximately 5 degrees (5°) past its highest vertical point, as illustrated in FIG. 12B. Due to the rotation of disc 28 (as illustrated by the arrow in FIGS. 12A–12G) and movement of press plate 26, the dough 32 will be transported atop disc 28 as the rotation of first cam 66, second cam 68, first gear 72, and second gear 74 urge press plate 26 downward toward press disc 28, as illustrated in FIG. 12C.

Figure 12D:
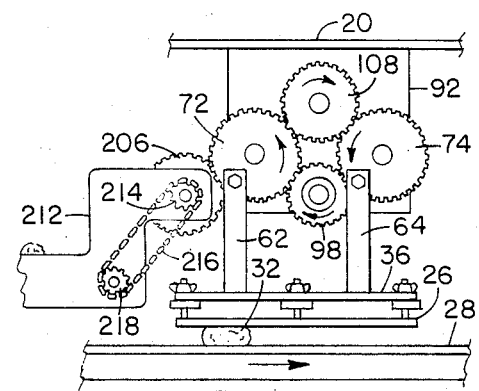
Figure 12E:
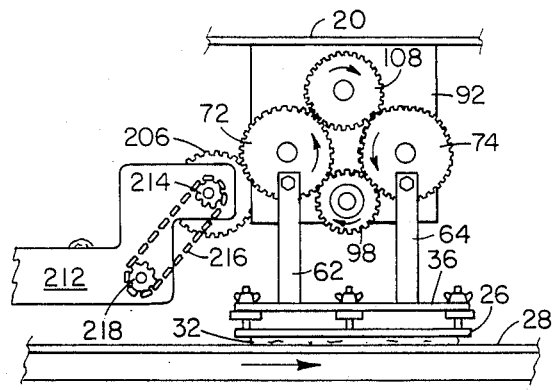
Figure 12F:
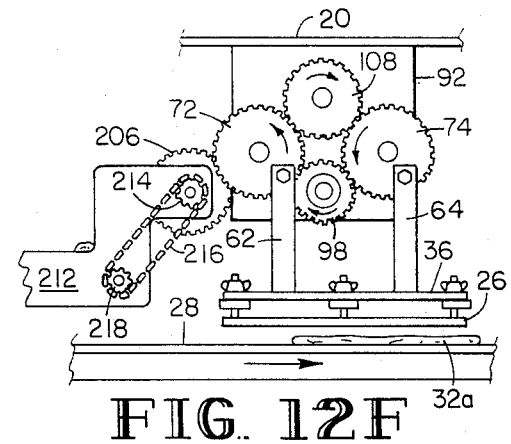
Figure 12G:
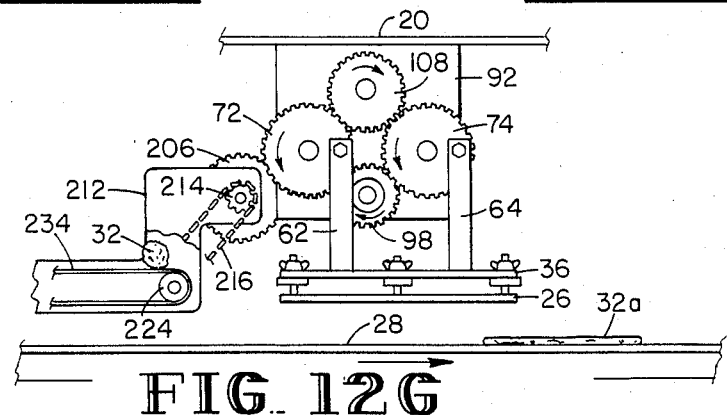

As illustrated in FIG. 12D, the press plate 26 will initially contact the dough 32 atop plate 28 and begin to press the dough 32 against disc 28. As the press plate 26 presses the dough 32, press plate 26 travels in basically the same direction as disc 28 and at a horizontal speed substantially equivalent to the angular speed of the press disc 28. The press plate 26 continues to press the ball of dough 32 against disc 28 until the press plate reaches its lowest point of travel in proximity to press disc 28, as illustrated in FIG. 12E. It is preferred that plate 26 not contact disc 28. The press plate 26 thereafter begins its upward movement away from press disc 28, as illustrated in FIG. 12F, thereby allowing the newly formed tortilla or bakery product 32a to continue its movement atop rotating disc 28. As the press plate 26 rotates upward relative to disc 28, the feeder belt 234 prepares to deposit another ball of dough 32 atop disc 28, as illustrated in FIG. 12G.

Once the formed bakery product 32a has been pressed beneath press plate 26, it continues its rotation atop rotatable press disc 28 until it is scraped therefrom by fixed scraper 272 and received therefrom by slide 276, in a manner as described in U.S. Pat. No. 4,508,025. The slide 276 allows the bakery product 32a to turn over and thereafter be received by first cooking disc 154. As first cooking disc 154 is rotated, a first side of the bakery product 32a is toasted. The bakery product 32a is thereafter rotated atop first cooking disc 154 until it is removed therefrom by fixed scraper 278 and received by slide 284. Slide 284 allows the bakery product 32a to turn over and thereafter be deposited atop second cooking disc 176 to permit toasting of the second or opposite side of the bakery product 32a. The bakery product 32a is thereafter rotated atop second cooking disc 176 unti it is removed therefrom by scraper 286. The bakery product 32a is thereafter received atop cooling tray 294. The formed and toasted bakery product 32a may thereafter be removed from the cooling tray 294 for human consumption.

It is to be understood that the press plate 26 and press disc 28 are heated by heater element 46 and gas burner 242, respectively, solely to permit release of the formed tortilla or bakery product 32a therefrom and that only a small amount of toasting of the bakery product 32a occurs on the rotating disc 28. It is also to be understood that the thickness of the formed bakery product 32a can be controlled by adjusting the distance between the press plate 26 and adjustment ring 36 by means of adjustment screws 42 and wing nuts 44. Increasing the vertical distance between adjustment ring 36 and press plate 26 will result in a decreased thickness of the bakery product 32a. Decreasing the vertical distance between adjustment ring 36 and press plate 26 will result in an increased thickness of the bakery product 32a. Further, screws 42 may be adjusted as necessary in order to maintain plate 26 in a level position.

It is to be understood that press plate 26 normally rotates in a generally circular path at an angular speed having both vertical and horizontal components or vectors. Further, it is the vertical vector or vertical press motion which actually presses the portion of ingredients 32 to form a bakery product 32a. Press plate 26 may also be described as moving tangentially relative to the upper surface of disc 28. Throughout its rotation, plate 26 remains substantially horizontal and substantially parallel to substantially horizontal disc 28. It is also to be understood that the gear mechanism disclosed herein synchronizes the movement of press plate 26 and disc 28 and feeder belt 234 to provide a continuous formation of bakery products 32a.

In the preferred embodiment, press plate 26 has a diameter of approximately ten inches (10") and press disc 28 has a diameter of approximately twenty-six inches (26"). Further, disc 28 preferably rotates at approximately one and one-half (1½) revolutions per minute (rpm). Finally, gear reduction motor 96 is initially reduced down to fourteen (14) revolutions per minute and ultimately reduced down to eight (8) revolutions per minute, so that press plate 26 will press against disc 28 eight (8) times per minute to form four hundred eighty (480) bakery products 32a per hour.

In the preferred embodiment, drive gear 98 has twenty-eight (28) teeth and an outside diameter of approximately 2.5 inches. Gears 72 and 74 preferably have forty-eight (48) teeth and an outside diameter of approximately 4.16 inches. Cams 66 and 68 also have an outside diameter of approximately 4.16 inches. Gear 108 preferably has forty (40) teeth and an outside diameter of approximately 3.5 inches. Right angle bevel gear 118 preferably has seventy-two (72) teeth and an outside diameter of approximately 6.02 inches. Pinion gear 116 preferably has twelve (12) teeth and an outside diameter of approximately 1.24 inches.

First conveyor drive gear 204 preferably has forty (40) teeth and an outside diameter of approximately 2.1 inches. Second conveyor drive gear 206 preferably has eighty (80) teeth and an outside diameter of approximately 4.1 inches. Sprockets 214 and 218 each preferably have thirteen (13) teeth.

Drive sheave 224 preferably has a length of approximately three inches (3") and a diameter of approximately 2.7 inches. In the preferred embodiment, ten (10) balls of dough (preferably having a diameter of approximately one inch) are placed atop belt 234 at spaced intervals defined by timing marks 236. The ball of dough 32 is preferably dropped onto disc 28 approximately three inches (3") from the outside diameter of disc 28. Further, disc 28 will preferably rotate approximately eight inches (8") from the time dough 32 contacts disc 28 until dough 32 is completely pressed into a bakery product 32a. Finally, plate 26 will preferably have a vertical travel of approximately three inches (3").

It is to be understood that a cover may be placed around the motor 96 and/or gas piping 246, 254, and 264 extending outward from housing 20. Further, the location of the pressing mechanism within housing 20, away from the operator's hands, provides a safety feature. Also, allowing the operator to place a plurality of dough balls 32 atop conveyor 234 frees the operator to attend to other tasks while the plurality of dough balls 32 are pressed into bakery products 32a and toasted. It is also to be understood that a conveyor belt or other lower press support synchronized with plate 26 may be substituted for disc 28 with the formed bakery product thereafter toasted in any manner. Finally, it is to be understood that the press plate 26 may be readily removed and replaced, if necessary.

While the invention synchronized press for bakery products has been described in connection with the preferred embodiment, it is not intended to limit the invention to the particular form set forth, but on the contrary, it is intended to cover such alternatives, modifications, and equivalents, as may be included within the spirit and scope of the invention as defined by the appended claims.

I claim:

1. Apparatus for forming a bakery product comprising:
   a horizontal press plate revolving about a fixed horizontal axis whose horizontal component of motion is wholly linear;
   a press disc for receiving portions of bakery product ingredients thereon rotatable at an angular speed about a substantially vertical axis; and
   means for synchronizing movement of said press plate and said press disc whereby said press plate presses said portion of bakery product ingredients against said press disc and said horizontal component of motion of said press plate is substantially equivalent to said angular speed of said press disc when said press plate is pressing against said portion of bakery product ingredients.

2. Apparatus for forming a bakery product, as recited in claim 1, further comprising means for heating said press plate and means for heating said disc.

3. Apparatus for forming a bakery product, as recited in claim 1, further comprising means for depositing portions of said bakery product ingredients on said disc in timed intervals.

4. Apparatus for forming a bakery product, as recited in claim 3, wherein said means for depositing portions of said bakery product ingredients on said disc comprises conveyor means including a conveyor belt for receiving said portions of said bakery product ingredients thereon in spaced intervals.

5. Apparatus for forming a bakery product, as recited in claim 3, wherein said means for depositing portions of said bakery product ingredients on said disc comprises conveyor means including conveyor drive means in operative engagement with said means for synchronizing movement of said press plate and said press disc.

6. Apparatus for forming a bakery product, as recited in claim 1, wherein said means for synchronizing movement of said press plate and said press disc comprises plate drive means in operative engagement with said plate and disc drive means, said disc drive means in operative engagement with said disc.

7. Apparatus for forming a bakery product, as recited in claim 6, wherein said plate drive means comprise a motor in geared engagement with a plate drive gear in operative engagement with said plate, said plate drive gear in operative engagement with a disc drive gear, said disc drive gear in operative engagement with said disc.

8. Apparatus for forming a bakery product, as recited in claim 1, wherein said press plate travels only in a generally circular path in the vertical plane.

9. Apparatus for forming a bakery product, as recited in claim 1, wherein said press plate and press disc are substantially horizontal and said press plate is substantially parallel to said press disc.

10. Apparatus for forming a bakery product comprising:
    first press means;
    second press means for receiving a portion of bakery product ingredients thereon rotatable in a substantially horizontal plane and about a fixed and substantially vertical axis;
    means for synchronizing movement of said first press means and said second press means whereby said first press means presses said portion of bakery product ingredients against said second press means, said first press means travelling only in a substantially circular path within a substantially vertical plane, and horizontal speed of said first press means is substantially equivalent to angular speed of said second press means when said press means presses said portion of said bakery product ingredients.

11. Apparatus for forming a bakery product, as recited in claim 10, wherein said first press means comprises a press plate connected to an adjustment ring and means for adjusting the distance between said press plate and said adjustment ring.

12. Apparatus for forming a bakery product, as recited in claim 11, wherein said press plate has a plurality of studs extending upward therefrom through corresponding passages in said adjustment ring and wherein said distance adjusting means comprises a plurality of adjustment screws, each of which is in threaded engagement with one of said studs intermediate said press plate and said adjustment ring, said distance adjusting means further comprising a plurality of nuts, each of which is in threaded engagement with one of said studs on a side of said adjustment ring opposite said adjustment screws.

13. Apparatus for forming a bakery product, as recited in claim 10, wherein said second press means comprises a press disc and said apparatus further comprises a pair of follower bearings located immediately beneath a periphery of said disc.

14. Apparatus for forming a bakery product, comprising:
a substantially horizontal upper press plate moveable in a generally circular path in a vertical plane at a predetermined angular speed having both vertical and horizontal components;
movable lower press means for receiving a portion of bakery product ingredients thereon; and
means for synchronizing rotation of said upper press plate with movement of said lower press means whereby said vertical component of said upper press plate causes said press plate to press said portion of bakery product ingredients against said lower press means and whereby said horizontal speed of said upper press plate is substantially equivalent to tangential speed of said lower press means when said press means presses said portion of said bakery product ingredients.

* * * * *